(12) United States Patent
Jeong et al.

(10) Patent No.: US 6,899,993 B2
(45) Date of Patent: May 31, 2005

(54) OPTICAL DISK AND METHOD OF FABRICATING THE SAME

(75) Inventors: Tae Hee Jeong, Kyonggi-do (KR); Hun Seo, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 10/133,959

(22) Filed: Apr. 26, 2002

(65) Prior Publication Data

US 2002/0160307 A1 Oct. 31, 2002

(30) Foreign Application Priority Data

Apr. 30, 2001 (KR) ........................................ 2001-23387
Jun. 8, 2001 (KR) ........................................ 2001-32109

(51) Int. Cl.[7] ............................ G11B 11/00; B32B 7/00
(52) U.S. Cl. ................. 430/270.13; 369/286; 428/64.1
(58) Field of Search ....................... 430/270.13, 270.11; 369/286; 428/64.1–65.1

(56) References Cited

U.S. PATENT DOCUMENTS 4,670,345 A * 6/1987 Morimoto et al. ........ 428/411.1
6,312,780 B1 * 11/2001 Kasami et al. ............. 428/64.1

FOREIGN PATENT DOCUMENTS

| JP | 03-160634 | * 7/1991 | |
| JP | 11-096597 | * 4/1999 | |
| JP | 2000-331379 | 11/2000 | ............ G11B/7/24 |
| JP | 2001-357560 | 12/2001 | ............ G11B/7/24 |
| JP | 2002-50079 | 2/2002 | ............ G11B/7/24 |
| JP | 2002-237098 | 8/2002 | ............ G11B/7/24 |
| JP | 2002-245674 | 8/2002 | ............ G11B/7/24 |

* cited by examiner

*Primary Examiner*—Mark F. Huff
*Assistant Examiner*—Kripa Sagar
(74) *Attorney, Agent, or Firm*—Lee, Hong, Degerman, Kang & Schmadeka

(57) ABSTRACT

An optical disk and a method of fabricating the optical disk capable of improving the signal quality and the productivity are disclosed. The optical disk includes a plurality of reflective layers stacked on a substrate, amorphous layers formed among the reflective layers which include a small amount of oxide therein, a recording layer, formed on the reflective layer, for recording information, and a cover layer formed on the recording layer.

17 Claims, 5 Drawing Sheets

200mm (a) Al

200mm (b) Al-SiO

OPTICAL DISK AND METHOD OF FABRICATING THE SAME

This application claims the benefit of the Korean Application Nos. P2001-23387 and P2001-32109 filed on Apr. 30, 2001 and Jun. 8, 2001, respectively, which are hereby incorporated by reference.

BACKGROUND OF THE INVENTION

1. Field of the Invention

The present invention relates to an optical disk and a method of fabricating the optical disk.

2. Discussion of the Related Art

Generally, in a phase-change type optical disk, recorded information is erased in a manner that a local area of a recording layer is heated and melted by irradiating a laser beam onto the area, and then an amorphous mark is made on a crystal matrix through a quick cooling using a disk structure designed to have a quick heat diffusion.

The phase-change type optical disk having the above-described principle is typically composed of a simple four-layer film, i.e., a four-layer film structure in that a lower dielectric layer, a recording layer, an upper dielectric layer, and a reflective layer are stacked on a substrate.

The optical disk may have a structure composed of more than four layers. In this case, any additional layers may be formed among the basic four layers. At this time, the reflective layer is formed at the end.

This structure formed in the above-described order is called a normal stacking structure.

Recently, with the development of a high-density recordable medium, there is a tendency to increase the numerical aperture of an object lens of an optical pickup and to bring the wavelength of a recording optical source into being shorter in an optical recording apparatus.

In this case, as the numerical aperture is increased, the working distance between the object lens and the recording layer of the optical recording medium becomes shorter. Accordingly, the thickness of a transparent substrate that exists in the middle of the optical source and the recording layer should be reduced.

Consequently, the role of the substrate has progressed from its own function for supporting the thin film in the previous normal stacking structure to a thin cover layer for covering the multi-layer thin film that exists on the path through which the laser passes.

Also, in case of increasing the numerical aperture of the lens, a coma aberration due to a tilt that is one of mechanical fluctuations of the disc is greatly increased in proportion to the cube of the numerical aperture. Especially, since the coma aberration becomes greater as the thickness of the substrate positioned on the path through which the incident laser beam passes becomes thicker, the thickness of the substrate should be reduced.

In this case, the stacking order of the thin film is a reversed stacking order in that the reflective layer is first stacked on the contrary to the normal stacking order in that the reflective layer is last stacked.

In such a reversed stacking structure, the reflective layer is first formed on the substrate, other layers are stacked, and then a cover layer is formed over the upper part of the formed structure. Accordingly, the signal characteristics of the optical disk is greatly influenced by the micro structure of the surface of the reflective layer that is the thin film positioned on the lowest part of the structure. Especially, a focus error signal becomes greater in a dynamic driving state of the medium, and this causes a medium noise to be increased.

As a result, a surface roughness of the recording medium that causes the medium noise should be lowered.

In order to lower the surface roughness of the reflective layer, an ion beam sputtering method has been proposed instead of a typical sputtering method. However, this method has the drawbacks in that the time required for the whole process is too long to be suitable for mass production.

SUMMARY OF THE INVENTION

Accordingly, the present invention is directed to an optical disk and a method of fabricating the same that substantially obviate one or more problems due to limitations and disadvantages of the related art.

An object of the present invention is to provide an optical disk and a method of fabricating the same that can provide a superior signal quality by reducing the surface roughness of a reflective layer.

Another object of the present invention is to provide an optical disk and a method of fabricating the same that has a superior productivity with a simple process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical disk includes a substrate, a plurality of reflective layers stacked on the substrate, amorphous layers formed among the respective reflective layers, a recording layer, formed on the reflective layer, for recording information, and a cover layer formed on the recording layer.

Here, the reflective layer is made of a mixture obtained by adding $SiO_2$ to any one of Al, Al alloy, Ag, and Ag alloy, and a dielectric layer composed of ZnS—$SiO_2$ is formed on upper and lower parts of the recording layer.

The amorphous layer is made of any one of Si-oxide, Al-oxide, Ti-oxide, Cr-oxide and ZnS—$siO_2$, or made of either of a Ge—Sb—Te type alloy thin film and a Ag—In—Sb—Te type alloy thin film.

In another aspect of the present invention, a method of fabricating an optical disk includes the steps of forming by turns a first reflective layer and an amorphous layer on a substrate, forming a second reflective layer on the amorphous layer, forming by turns an upper dielectric layer, a recording layer, and a lower dielectric layer on the second recording layer, and forming a cover layer on the lower dielectric layer.

At this time, the step of forming by turns the first reflective layer and the amorphous layer on the substrate may be repeated according to circumstances.

According to the present invention fabricated as described above, the surface roughness of the reflective layer is greatly reduced, and thus an optical recording medium having a superior signal quality can be obtained. Also, a multi-layer reflective layer can be formed by the existing sputtering method, and its productivity is superior.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
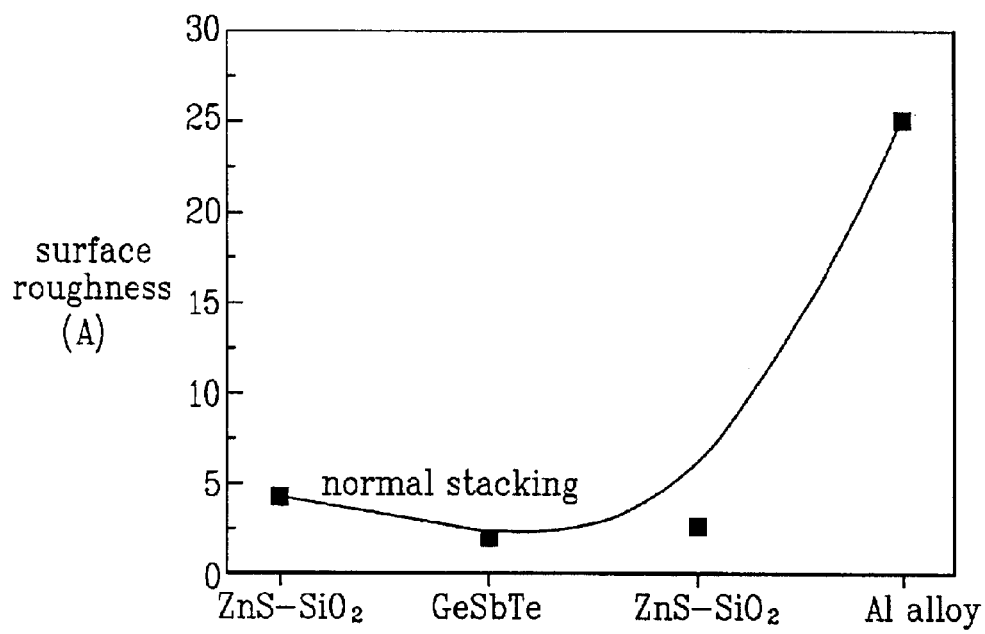
FIG. 1 is a graph illustrating the surface roughness on interfaces of the respective layers during a normal stacking.
Figure 2:
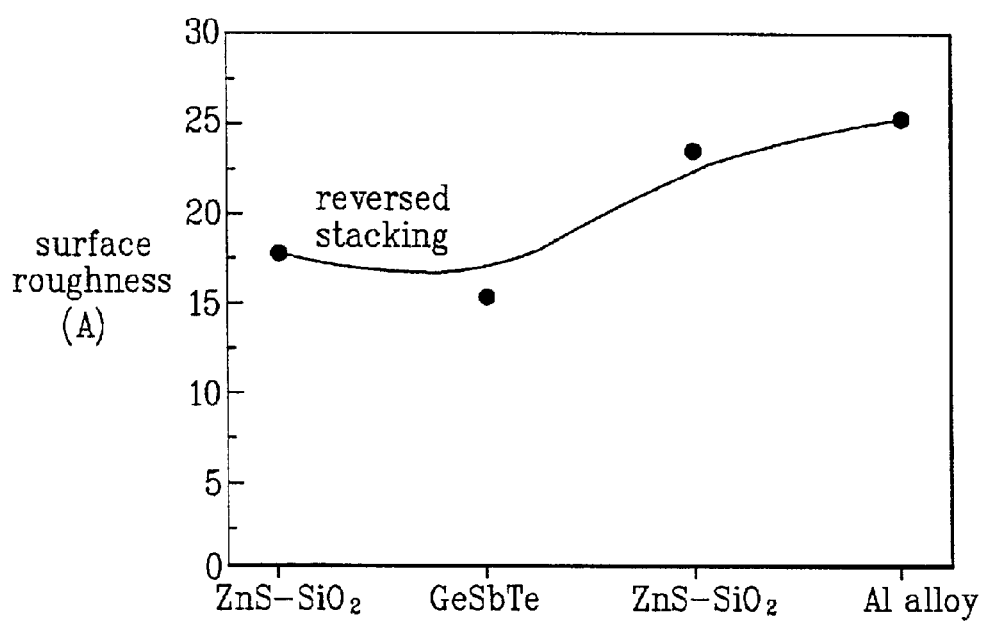
FIG. 2 is a graph illustrating the surface roughness on interfaces of the respective layers during a reversed stacking.

FIG. 1 is a graph illustrating the surface roughness on interfaces of the respective layers during a normal stacking, and FIG. 2 is a graph illustrating the surface roughness on interfaces of the respective layers during a reversed stacking.

In case of the normal stacking as shown in FIG. 1, the main reflected signal is detected from the upper and lower parts of the recording layer during the recording/reproducing operation, and thus the great surface roughness of the recording layer does not affect the signal characteristics of the recording medium.

On the contrary, in case of the reversed stacking as shown in FIG. 2, the great surface roughness of the recording layer due to the surface roughness of the reflective layer causes the generation of noise during the detection of the recorded/ reproduced signal, and this greatly deteriorates the signal.

Specifically, the great surface roughness of the recording layer due to the surface roughness of the reflective layer causes a focus error signal in the dynamic driving state of the optical recording medium, and this causes the noise of the medium to be increased.

The present invention improves the surface roughness of the reflective layer appearing in the reversed stacking structure of the optical disk by forming at least one amorphous layer among the reflective layers.

That is, the present invention is directed not to form the reflective layer made of Al, etc., as a single layer as in the conventional manner, but to form one or more intermediate layers having an amorphous structure among the reflective layers to lower the surface roughness of the reflective layer.

Figure 3A:
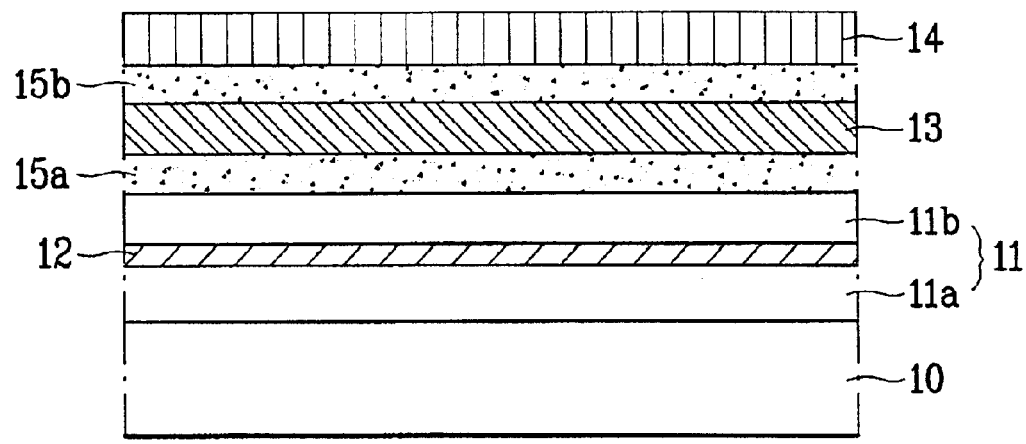
FIGS. 3A and 3B are cross-sectional views illustrating the structure of an optical disk according to first and second embodiments of the present invention.
Figure 3B:
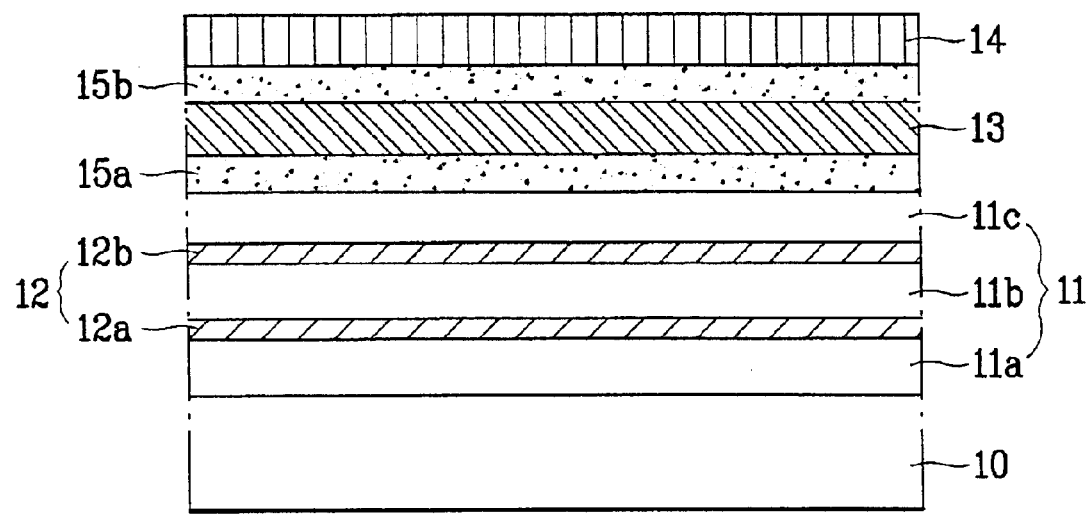

FIGS. 3A and 3B are cross-sectional views illustrating the structure of an optical disk according to first and second embodiments of the present invention. FIG. 3A shows the embodiment employing one amorphous layer formed between the reflective layers, and FIG. 3B shows the embodiment employing a plurality of amorphous layers formed among the reflective layers.

According to the present invention, as shown in FIGS. 3A and 3B, a plurality of reflective layers 11 are stacked on a polycarbonate substrate 10 having a thickness of about 1.1 mm, and amorphous layer(s) 12 is(are) formed among the respective reflective layers 11. A recording layer 13 for recording information is formed on the upper reflective layer 11, and a cover layer 14 with a thickness of about 0.1~0.12 mm is formed on the recording layer 13.

Here, the reflective layer 11 is made of a mixture obtained by adding $SiO_2$ to any one of Al, Al alloy, Ag, and Ag alloy in the ratio of 0.1~10 mol %, and its thickness is in the range of 100~1000 Å. This is based on the characteristics in that the larger the amount of added $SiO_2$ is added, the smaller the surface roughness of the reflective layer 11 becomes.

At this time, in case of forming one amorphous layer 12 between the two reflective layers 11 according to the first embodiment of the present invention, the thickness of the respective reflective layers 11 is set to about 500 Å, and in case of forming a plurality of amorphous layers 12 among the reflective layers 11 according to the second embodiment of the present invention, the thickness of the respective reflective layers is set to about 330 Å.

Also, the amorphous layer 12 formed between the reflective layers 11 is made of any one of Si-oxide, Al-oxide, Ti-oxide, Cr-oxide, ZnS—$SiO_2$, and mixtures thereof, or made of either a Ge—Sb—Te type alloy thin film or a Ag—In—Sb—Te type alloy thin film. Its thickness is in the range of about 20~40 Å, and in the embodiments of the present invention, its thickness is set to about 30 Å.

The recording layer 13 is made of a Sb—Te—Ge alloy or an Ag—In—Sb—Te type alloy, and its thickness is in the range of about 100~300 Å.

On the upper and lower parts of the recording layer 13 are formed dielectric layers 15. Under certain circumstances, the dielectric layer 15 may be formed. The dielectric layer 15 is made of one among ZnS—$SiO_2$, $SiO_2$, SiN, $(Zr_xCe_{1-x})_yO_{1-y}$, AlN, and $Al_2O_3$. The thickness of the dielectric layer 15b formed on the upper part of the recording layer 13 is in the range of about 500~3000 Å, and the thickness of the dielectric layer 15a formed on the lower part of the recording layer 13 is in the range of about 100~500 Å.

The cover layer 14 may be made of UV curing resin, and its thickness is in the range of 0.1~0.12 mm or is bounded less than 0.1 mm thickness polycarbonate film with UV curing resin.

Now, the method of fabricating the optical disk according to the present invention will be explained.

The optical disk fabricating method according to the present invention uses a magnetron sputtering deposition. Specifically, Ar that is an inert gas is filled in a vacuum chamber (not illustrated), and ionized by applying a high DC or RF (radio frequency) voltage to a target that is the source of the thin film. Then, the thin films are formed using ions emitted by the collision of the ionized Ar with the target.

According to the above magnetron sputtering deposition, the thin films of not only metals but also dielectric materials can be easily formed. Also, since the process is performed using a high-level energy, the adhesive strength of the thin film becomes great. Also, since its step coverage is superior, a uniform thin film can be formed.

First, a first reflective layer 11a and an amorphous layer 12 are formed by turns on a substrate 10, and then a second reflective layer 11b is formed on the amorphous layer 12.

At this time, the first and second reflective layers 11a and 11b are deposited by sputtering a target in which a metal and $SiO_2$ are mixed together, i.e., either of an Al—$SiO_2$ target and an Ag—$SiO_2$ target, or by co-sputtering an $SiO_2$ target and either of an Al target and an Ag target.

Here, in case of inserting several amorphous layers 12 as shown in FIG. 3b, the above-described process is repeatedly performed to form by turns a second reflective layer 11b and a second amorphous layer 12b on a first amorphous layer 12a, and to form a third reflective layer 11c on the second amorphous layer 12b.

Thereafter, a upper dielectric layer 15a, a recording layer 15, and an lower dielectric layer 15b are formed by turns on the upper reflective layer 11c, and then a cover layer 14 is formed thereon with a thickness of about 0.1~0.12 mm using a UV curing resin to produce an optical disk.

Figure 4:
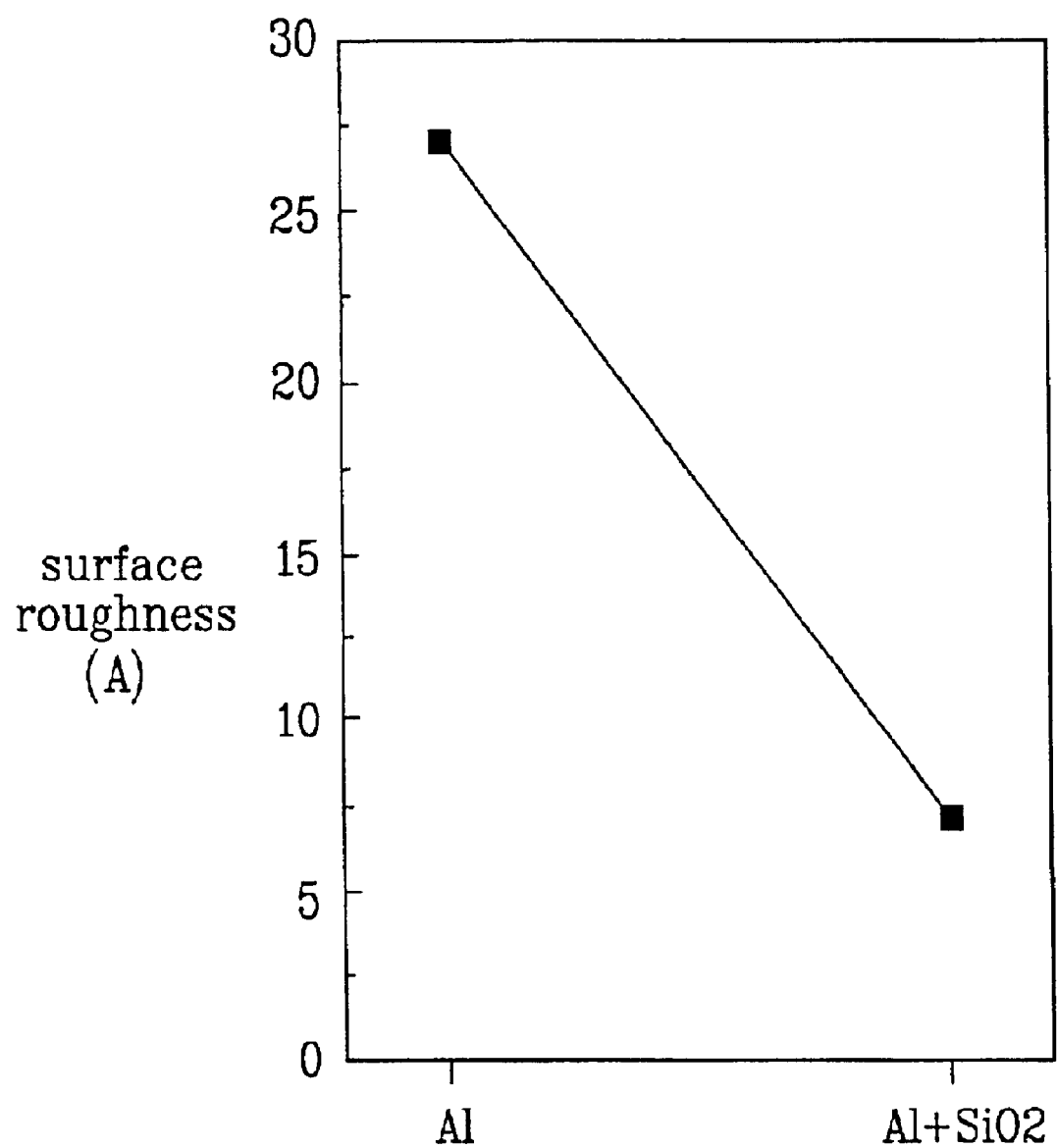
FIG. 4 is a graph illustrating the surface roughness according to addition of $SiO_2$ to the reflective layer.
Figure 7:
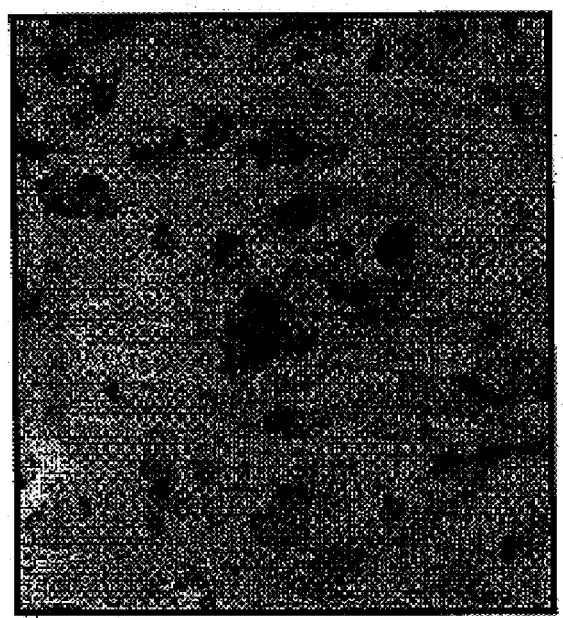
FIG. 7 is a TEM image showing the effect of the addition of $SiO_2$ into Al-matrix.
Figure 7:
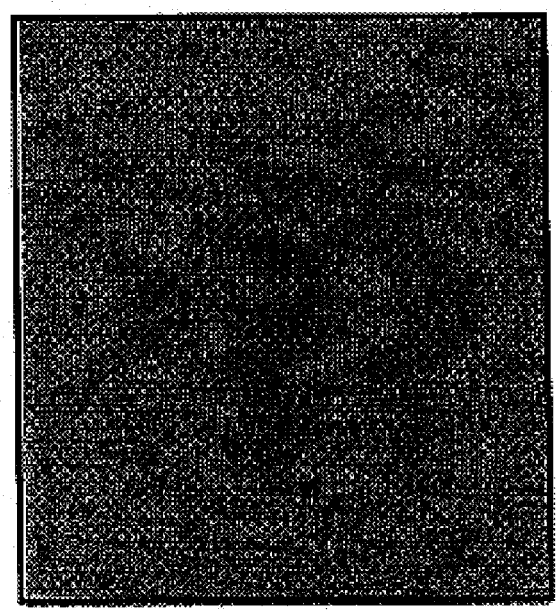

FIG. 4 and 7 illustrate the resulting effect of surface roughness according to the addition of $SiO_2$ into the Al reflective layer. FIG. 4 shows that the surface roughness becomes smaller as $SiO_2$ is added.

The reason why the surface roughness of the reflective layer is reduced is that $SiO_2$ has a pinning role of grain boundary movement. So a precipitated $SiO_2$ suppresses a columnar growth of Al possibly due to drag force acting on grain boundary.

Figure 5:
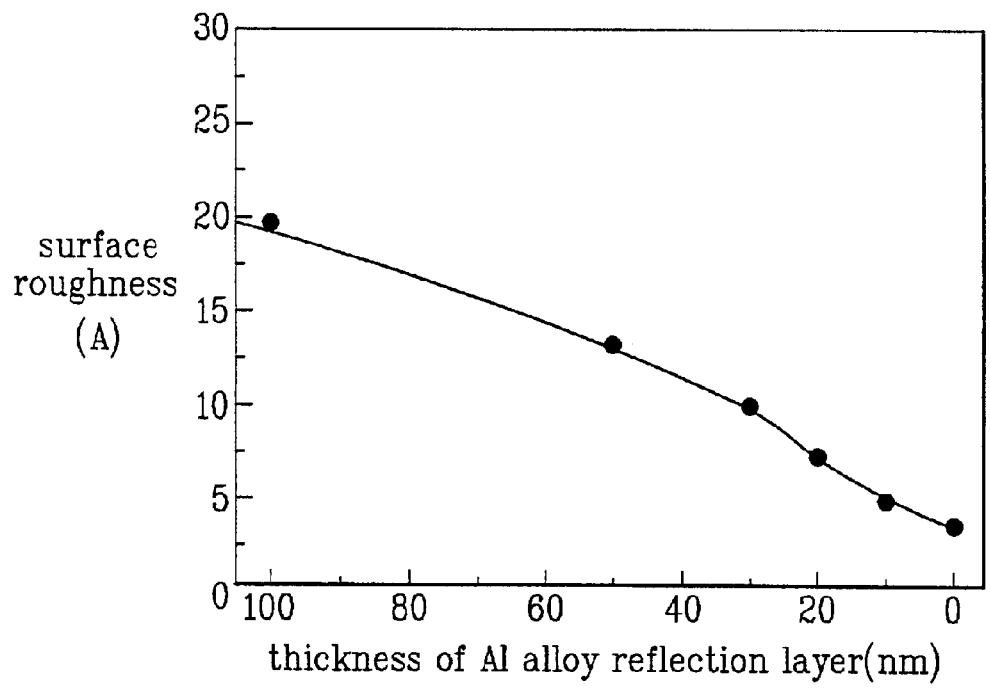
FIG. 5 is a graph illustrating the surface roughness according to the thickness of the reflective layer of the optical disk.

FIG. 5 is a graph illustrating the surface roughness according to the thickness of the reflective layer of the optical disk. As shown in FIG. 5, the surface roughness is linearly reduced as the thickness of the reflective layer becomes smaller.

According to the present invention, a single reflective layer is not formed, but a plurality of unit reflective layers having a small thickness are stacked with amorphous layers having a small thickness inserted therein, respectively, so that the whole thickness of the reflective layer is constant, and the surface roughness is improved.

Figure 6:
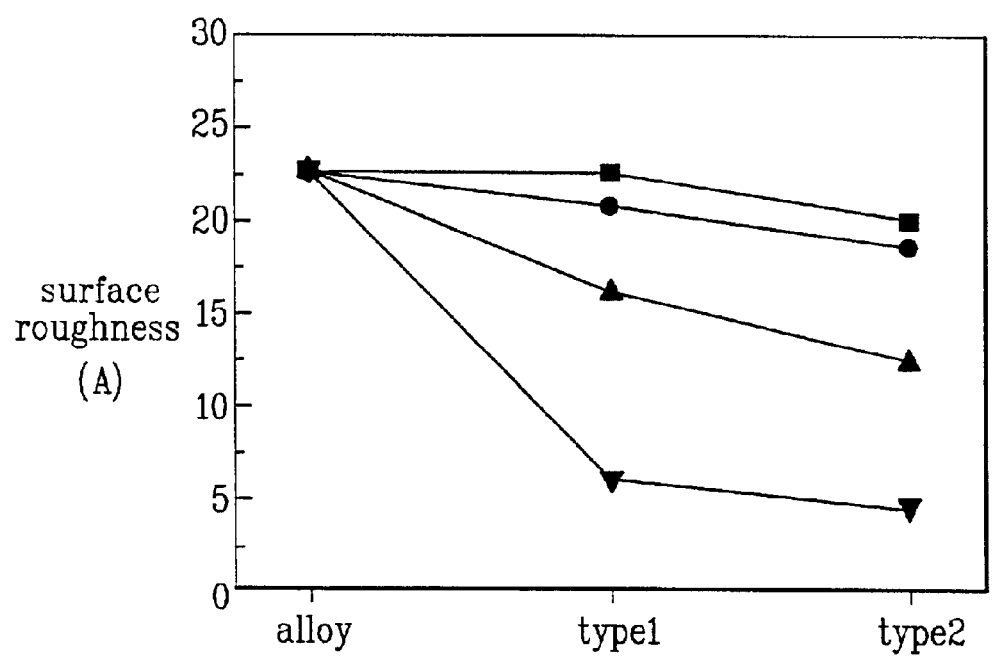
FIG. 6 is a graph illustrating the comparative surface roughness of the reflective layer having an amorphous layer inserted therein and the reflective layer having no amorphous layer.

FIG. 6 is a graph illustrating the comparative surface roughness of the reflective layer having an amorphous layer inserted therein and the reflective layer having no amorphous layer inserted therein.

Here, "Type 1" indicates a case that one amorphous layer of about 50 Å is inserted between two reflective layers of about 1000 Å. "Type 2" indicates a case that two amorphous layers of about 30 Å are inserted among reflective layers of about 1000 Å. Also, four kinds of amorphous layers are used in comparing the surface roughness of the reflective layers.

As shown in FIG. 6, the surface roughness of the reflective layer of 1000 Å that has no amorphous layer inserted therein is about 23 Å. On the contrary, the surface roughness of the reflective layer having an amorphous layer inserted as an intermediate layer is abruptly decreased though there is a difference according to the kind of the amorphous layers.

The reason why the surface roughness of the reflective layer is reduced is that a column structure is formed as the reflective layer is grown, and a great column is formed due to a mutual combination among columns to increase the surface roughness.

That is, in view of the grain growth of a general phase change theory, the great column structure causes the surface roughness to be increased.

On the contrary, in case of inserting the amorphous layer between the reflective layers, the column growth due to the continuous growth is disturbed, and a new crystalline layer is formed on the surface of the amorphous layer, so that the final surface roughness of the reflective layer is greatly reduced.

As described above, the optical disk according to the present invention has the advantages in that the surface roughness of the reflective layer is reduced through insertion of an amorphous layer into the reflective layers, and thus the optical disk has a superior signal quality. Also, according to the optical disk fabricating method according to the present invention, multiple reflective layers can be formed by the existing sputtering method with a superior productivity.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. An optical disk comprising:

a substrate;

a plurality of reflective layers stacked on the substrate;

amorphous layers formed among the reflective layers;

a recording layer, formed on the reflective layer, for recording information, the reflective layer comprising the plurality of reflective layers and the amorphous layers formed among the reflective layers; and a cover layer formed on the recording layer;

wherein the reflective layer is made of a mixture obtained by adding an oxide to any one selected from the group consisting of Al, Al alloy, Ag, and Ag alloy;

wherein the adding ratio of the oxide is in the range of 0.1~10 mol %.

2. The optical disk as claimed in claim 1, wherein the oxide is SiO2.

3. The optical disk as claimed in claim 1, wherein the thickness of the reflective layer is in the range of 100~1000 Å.

4. The optical disk as claimed in claim 1, wherein the amorphous layer is made of a material selected from the group consisting of Si-oxide, Al-oxide, Ti-oxide, Cr-oxide, and ZnS—SiO2.

5. The optical disk as claimed in claim 1, wherein the amorphous layer is made of either of a Ge—Sb—Te type alloy thin film and an Ag—In—Sb—Te type alloy thin film.

6. The optical disk as claimed in claim 1, wherein the thickness of the amorphous layer is in the range of 10~50 Å.

7. The optical disk as claimed in claim 1, wherein the recording layer is made of either of a Sb—Te—Ge alloy and an Ag—In—Sb—Te type alloy, and its thickness is in the range of 100~300 Å.

8. The optical disk as claimed in claim 1, further comprising upper and lower dielectric layers formed on upper and lower parts of the recording layer, respectively.

9. The optical disk as claimed in claim 8, wherein the upper and lower dielectric layers are made of one selected from the group consisting of ZnS—SiO2, SiO2, SiN, (ZrxCe1-x)yO1-y, AlN, and Al2O3.

10. The optical disk as claimed in claim 8, wherein the thickness of the upper dielectric layer is in the range of 100~300 Å, and the thickness of the lower dielectric layer is in the range of 500~3000 Å.

11. The optical disk as claimed in claim 1, wherein the cover layer is made of an UV curing resin, and its thickness is in the range of 0.09~0.12 mm.

12. A method of fabricating an optical disk comprising the steps of:

forming by turns a first reflective layer and an amorphous layer on a substrate;

forming a second reflective layer on the amorphous layer;

forming by turns an upper dielectric layer, a recording layer, and a lower dielectric layer on a recording layer; and forming a cover layer on the lower dielectric layer;

wherein the first and second reflective layers are formed by simultaneously sputtering a metal and an oxide, the oxide having an adding ratio in the range of 0.1~10 mol %.

13. The method as claimed in claim 12, wherein the step of forming by turns the first reflective layer and the dielectric layer on the substrate is repeatedly performed.

14. The method as claimed in claim 12, wherein the sputtering is performed using a target in which the metal and the oxide are mixed together.

15. The method as claimed in claim 14, wherein the target in which the metal and the oxide are mixed is either of an Al—SiO2 target and an Ag—SiO2 target.

16. The method as claimed in claim 12, wherein the sputtering is performed using a metal target and an oxide target.

17. The method as claimed in claim 16, wherein the metal target is any one of an Al target and an Ag target, and the oxide target is a SiO2 target.

* * * * *